United States Patent
Martini

(10) Patent No.: US 10,341,357 B2
(45) Date of Patent: Jul. 2, 2019

(54) SELECTIVELY PERFORMING MAN IN THE MIDDLE DECRYPTION

(71) Applicant: iboss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 795 days.

(21) Appl. No.: 14/265,540

(22) Filed: Apr. 30, 2014

(65) Prior Publication Data

US 2014/0317397 A1     Oct. 23, 2014

Related U.S. Application Data

(63) Continuation of application No. 13/865,850, filed on Apr. 18, 2013, now Pat. No. 8,739,243.

(51) Int. Cl.
*H04L 29/06* (2006.01)
*H04L 29/12* (2006.01)

(52) U.S. Cl.
CPC ........ *H04L 63/107* (2013.01); *H04L 63/0471* (2013.01); *H04L 63/1466* (2013.01); *H04L 63/306* (2013.01); *H04L 61/1511* (2013.01)

(58) Field of Classification Search
CPC .............................. G06F 12/16; G06F 21/552
USPC ........ 726/1, 14; 713/150, 151; 709/218, 246
See application file for complete search history.

(56) References Cited

U.S. PATENT DOCUMENTS

| | | |
|---|---|---|
| 5,835,726 A | 11/1998 | Shwed et al. |
| 6,594,682 B2 | 7/2003 | Peterson et al. |
| 6,742,047 B1 | 5/2004 | Tso |
| 7,516,485 B1 | 4/2009 | Lee et al. |
| 7,606,214 B1 | 10/2009 | Sekhar et al. |
| 7,761,594 B1 | 7/2010 | Mowat |
| 7,793,342 B1 | 9/2010 | Ebrahimi et al. |
| 7,810,160 B2 | 10/2010 | Dougherty et al. |

(Continued)

FOREIGN PATENT DOCUMENTS

EP     2 528 299 A1     11/2012

OTHER PUBLICATIONS

Nath Nayak et al. Different Flavours of Man-In-The-Middle Attack, Consequences and Feasible Solutions, IEEE 2010,pp. 491-495.*

(Continued)

*Primary Examiner* — Oleg Korsak
(74) *Attorney, Agent, or Firm* — Fish & Richardson P.C.

(57) ABSTRACT

A device within the network receives a domain name service (DNS) request for an address of a first resource outside the network, the first resource associated with a security policy of the network. An address of a second resource within the network is returned to the device within the network in response the DNS request, the second resource address having previously been associated with the first resource address. A first encrypted connection is established between the device and the second resource, and a second encrypted connection is established between the second resource and the first resource, to facilitate encrypted communication traffic between the device and the first resource. The encrypted communication traffic passing between the device and the first resource is selectively decrypted and inspected depending on the address of the first resource.

18 Claims, 5 Drawing Sheets

(56) References Cited

U.S. PATENT DOCUMENTS

| | | | |
|---|---|---|---|
| 7,945,779 B2* | 5/2011 | Martin | 713/170 |
| 8,046,495 B2* | 10/2011 | Cooper et al. | 709/246 |
| 8,225,085 B2* | 7/2012 | Karandikar | 713/153 |
| 8,561,181 B1* | 10/2013 | Hernacki et al. | 726/22 |
| 8,739,243 B1* | 5/2014 | Martini | 726/1 |
| 2002/0065938 A1 | 5/2002 | Jungck et al. | |
| 2002/0114453 A1 | 8/2002 | Bartholet et al. | |
| 2002/0178381 A1 | 11/2002 | Lee et al. | |
| 2003/0105981 A1 | 6/2003 | Miller et al. | |
| 2003/0131259 A1 | 7/2003 | Barton et al. | |
| 2004/0015725 A1 | 1/2004 | Boneh et al. | |
| 2004/0225895 A1 | 11/2004 | Mukherjee et al. | |
| 2005/0050362 A1 | 3/2005 | Peles | |
| 2006/0036572 A1 | 2/2006 | Kausik | |
| 2006/0064750 A1 | 3/2006 | Kersey et al. | |
| 2006/0136724 A1 | 6/2006 | Takeshima et al. | |
| 2007/0260871 A1 | 11/2007 | Paya et al. | |
| 2008/0040790 A1 | 2/2008 | Kuo | |
| 2008/0070573 A1 | 3/2008 | Dutta et al. | |
| 2008/0082662 A1 | 4/2008 | Dandliker et al. | |
| 2008/0126794 A1 | 5/2008 | Wang et al. | |
| 2008/0128495 A1 | 6/2008 | Weintraub et al. | |
| 2008/0163333 A1 | 7/2008 | Kasralikar | |
| 2008/0215877 A1 | 9/2008 | Brabson et al. | |
| 2009/0150972 A1 | 6/2009 | Moon et al. | |
| 2009/0193513 A1 | 7/2009 | Agarwal et al. | |
| 2009/0254990 A1 | 10/2009 | McGee | |
| 2010/0138910 A1* | 6/2010 | Aldor et al. | 726/14 |
| 2010/0146260 A1* | 6/2010 | Levow et al. | 713/154 |
| 2010/0218248 A1 | 8/2010 | Nice et al. | |
| 2010/0250754 A1 | 9/2010 | Birch et al. | |
| 2010/0313016 A1 | 12/2010 | Zhang et al. | |
| 2011/0083154 A1 | 4/2011 | Boersma | |
| 2011/0231929 A1 | 9/2011 | Rao et al. | |
| 2012/0290829 A1* | 11/2012 | Altman | 713/150 |
| 2013/0117400 A1 | 5/2013 | An et al. | |
| 2014/0143855 A1 | 5/2014 | Keoh et al. | |

OTHER PUBLICATIONS

Blue Coat White Paper—How to Gain Visibility and Control of Encrypted SSL Web Sessions, 2007, 13 pp.*
Acharya et al., "MPLS-based Request Routing", Jun. 10, 2001. Downloaded from the internet at: http://www.infu.fu-berlin.de/lebre/SS03/19531-V/lecture9.pdf, on Apr. 4, 2013, 9 pages.
Big-IP, "BIG-IP® Solutions Guide, Version 4.2", 2002, downloaded from the internet at http://support.f5.com/content/kb/en-us/archived_products/big-ip/manuals/product/bag42/_jcr_content/pdfAttach/download/file.res/BIG-IP_Controller_Solutions_Guide%2c_version_4.2.pdf on Apr. 4, 2013, 214 pages.
Blue Coat White Paper (How to Gain Visibility and Control of Encrypted SSL Web Sessions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.
Burkholder, "SSL Man-in-the-Middle Attacks," *Reading Room SANS*, 2002, downloaded from the internet at: http://www.sans.org/reading_room/whitepapers/threats/ssl-man-in-the-middle-attacks_480, on May 16, 2013, 17 pages.
Faruque, "Open Source Open Standard", Sep. 28, 2012, downloaded from the internet at: http://tektab.com/2012/09/28/squid_transparent-proxy-for-https-ssl-traffic/ on Apr. 26, 2013 5 pages.
Glype.com, "Glype Proxy Script", May 2, 2013, downloaded from the internet at http://www.glype.com/ on May 2, 2013, 2 pages.
Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opendns-for-content-filtering-visited-sites-log-etc on May 3, 2013 7 pages.
Murdoch, et al. "Tools and Technology of Internet Filtering," Dec. 2011, http://oni-access.net/wp-content/uploads/2011/12/accessdenied-chapter-3.pdf, on May 16, 2013, 16 pages.
Nayak et al. "Different Flavours of Man-In-The-Middle Attack, Consequences and Feasible Solutions", $3^{rd}$ IEEE International Conference on Computer Science and Information Technology (ICCSIT), Jul. 9-10, 2010, pp. 491-495.
Portswigger, Ltd. "Burp Proxy Options", Apr. 26, 2013, downloaded from the internet at: http://portswigger.net/burp/help/proxy_options.html#listerners_cert on Apr. 26, 2013, 4 pages.
Portswigger, Ltd. "Getting Started with Burp Suite", Apr. 26, 2013, downloaded from the internet at: http://portswigger.et/burp/help/suite_gettingstarted.html, on Apr. 26, 2013, 4 pages.
Proxy.appspot.com, "My Proxy Server", Apr. 26, 2013, downloaded from the internet at: http://mvv-proxy.appspot.com/ on Apr. 26, 2013, 1 page.
Rousskov , "Feature: Squid-in-the-middle SSL Bump," Apr. 20, 2012, downloaded from the Internet at: http://wiki.squid-cache.org/Features/SslBump on Apr. 26, 2013, 2 pages.
Ryan, "URL vs URI vs URN: The Confusion Continues", Jan. 18, 2011, downloaded from the internet at: http://damnhandy.com/2011/01/18/url-vs-uri-vs-urn-the-confusion-continues/ on Dec. 10, 2013, 7 pages.
Security Stack Exchange, "How do I check that I have a direct SSL connection to a website?" May 7, 2012, downloaded from the internet at: http://security.stackexchange.com/questions/14676/how-do-i-check-that-i-have-a-direct-ssl-connection-to-a-website on Apr. 26, 2013, 2 pages.
vonRandow, "SSL Proxying", Apr. 26, 2013, downloaded from the internet at: http://www.charlesproxy.com/documentation/proxying/ssl-proxying/ on Apr. 26, 2013, 2 pages.
Websense, Inc., "DNS Proxy Caching", 2011, downloaded from the internet at http://www.websense.com/content/support/library/web/v76/wcg_help/dns_proxy_caching.aspx on Apr. 4, 2013, 2 pages.
'WebSense,' [online]. "DNA Proxy Caching," 2011, [retrieved on Apr. 4, 2013]. Retrieved from the Internet: http://www.websense.com/content/support/library/web/v76/wcg_help/dns_proxy_caching.aspx, 2 pages.
International Search Report and Written Opinion issued in International Application No. PCT/US2014/034236, dated Jul. 24, 2014, 11 pages.
International Search Report and Written Opinion issued in International Application No. PCT/US2014/037009, dated Nov. 11, 2014, 10 pages.
Wikipedia, "Proxy server", Apr. 21, 2013, downloaded from the internet at: http://en.wikipedia.org/w/index.php?title=Proxy_server&oldid=551454120 on Oct. 31, 2014, 12 pages.

* cited by examiner

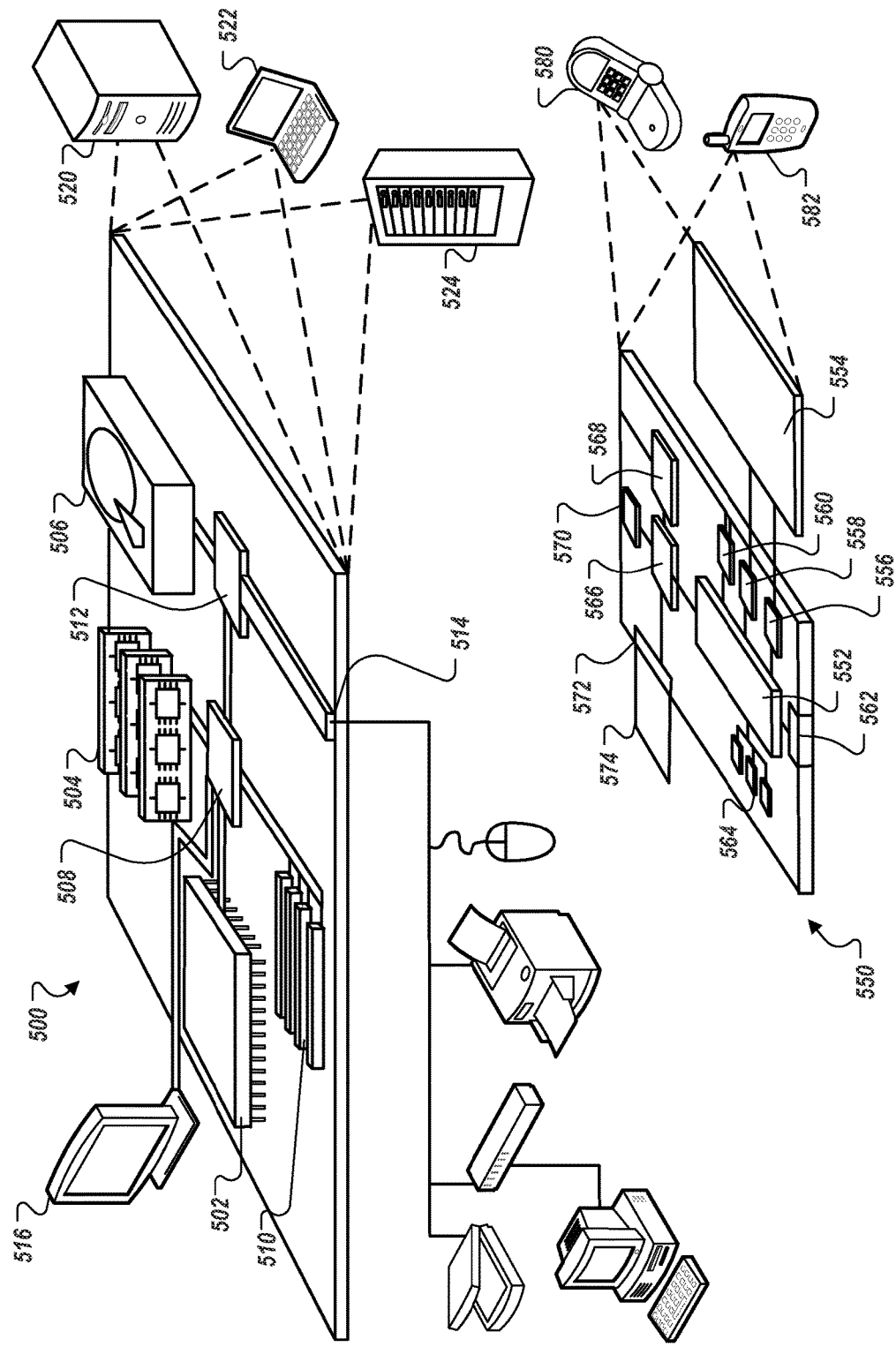

SELECTIVELY PERFORMING MAN IN THE MIDDLE DECRYPTION

CROSS-REFERENCE TO RELATED APPLICATIONS

This application is a continuation application of and claims priority to U.S. application Ser. No. 13/865,850, filed on Apr. 18, 2013, the entire contents of which are hereby incorporated by reference.

TECHNICAL FIELD

The present document relates to computer networking

BACKGROUND

A computer network is a collection of computers and other hardware interconnected by communication channels that allow sharing of resources and information. Communication protocols define the rules and data formats for exchanging information in a computer network. A gateway on a network is a node on the network equipped for interfacing with another network or networks. The gateway is often used for passing data between devices on different networks. Transport Layer Security (TLS) and Secure Socket Layer (SSL) are two examples of cryptographic communication protocols that provide communication security by allowing devices to exchange encrypted, as opposed to plaintext, messages.

SUMMARY

A network can include a network gateway for unencrypted communication with other networks. To facilitate selective man in the middle decryption of encrypted communication, Domain Name Service (DNS) requests from browser devices that pass through the network gateway can be intercepted, and responded to, by the network gateway, with the address or addresses of one or more man in the middle (MitM) gateways within the network. The browser device may the initiate a cryptographic session with a MitM gateway found at one of the addresses. The MitM gateway may act as a proxy for the website requested in the DNS request, providing the browser device with secure communications to the website while permitting traffic inspection at the network border.

In one aspect, a method is performed by data processing apparatuses. The method includes receiving, from a device within the network, a domain name service (DNS) request for an address of a first resource outside the network, the first resource associated with a security policy of the network. The method further includes returning, to the device within the network in response the DNS request, an address of a second resource within the network, the second resource address having previously been associated with the first resource address. The method further includes establishing a first encrypted connection between the device and the second resource, and a second encrypted connection between the second resource and the first resource, to facilitate encrypted communication traffic between the device and the first resource. The method further includes selectively decrypting and inspecting the encrypted communication traffic passing between the device and the first resource depending on the address of the first resource.

Implementations can include any, all, or none of the following features. The address of the first resource is determined by the second resource based on the address of the second resource. Decrypting and inspecting the encrypted communication traffic includes blocking the encrypted communication traffic. The method including selecting the second device from a plurality of available devices within the network. The second device is selected based on a comparison of the first resource with a rule defining destinations associated with encrypted communication traffic. The second device is selected based on hardware performance. The method including receiving, from a second device within the network, a second domain name service (DNS) request for an address of a third resource outside the network; sending, to the DNS, the second DNS request; receiving, from the DNS, a DNS response; returning, to the second device within the network in response the second DNS request, the second DNS request; and establishing a third encrypted connection between the second device and the third resource, to facilitate encrypted communication traffic between the second device and the third resource.

In one aspect, a computer storage media is encoded with computer program instructions that, when executed by one or more processors, cause a computer device to perform operations. The operations include receiving, from a device within the network, a domain name service (DNS) request for an address of a first resource outside the network, the first resource associated with a security policy of the network. The operations further include returning, to the device within the network in response the DNS request, an address of a second resource within the network, the second resource address having previously been associated with the first resource address. The operations further include establishing a first encrypted connection between the device and the second resource, and a second encrypted connection between the second resource and the first resource, to facilitate encrypted communication traffic between the device and the first resource. The operations further include selectively decrypting and inspecting the encrypted communication traffic passing between the device and the first resource depending on the address of the first resource.

Implementations can include any, all, or none of the following features. The address of the first resource is determined by the second resource based on the address of the second resource. Decrypting and inspecting the encrypted communication traffic includes blocking the encrypted communication traffic. The operations further include selecting the second device from a plurality of available devices within the network. The second device is selected based on a comparison of the first resource with a rule defining destinations associated with encrypted communication traffic. The second device is selected based on hardware performance. The operations further include receiving, from a second device within the network, a second domain name service (DNS) request for an address of a third resource outside the network; sending, to the DNS, the second DNS request; receiving, from the DNS, a DNS response; returning, to the second device within the network in response the second DNS request, the second DNS request; and establishing a third encrypted connection between the second device and the third resource, to facilitate encrypted communication traffic between the second device and the third resource.

A system comprises one or more processors configured to execute computer program instructions and computer storage media encoded with computer program instructions that, when executed by one or more processors, cause a computer device to perform operations. The operations include receiving, from a device within the network, a domain name service (DNS) request for an address of a first resource outside the network, the first resource associated with a security policy of the network. The operations further include returning, to the device within the network in response the DNS request, an address of a second resource within the network, the second resource address having previously been associated with the first resource address. The operations further include establishing a first encrypted connection between the device and the second resource, and a second encrypted connection between the second resource and the first resource, to facilitate encrypted communication traffic between the device and the first resource. The operations further include selectively decrypting and inspecting the encrypted communication traffic passing between the device and the first resource depending on the address of the first resource.

Implementations can include any, all, or none of the following features. The address of the first resource is determined by the second resource based on the address of the second resource. Decrypting and inspecting the encrypted communication traffic includes blocking the encrypted communication traffic. The operations further include selecting the second device from a plurality of available devices within the network. The second device is selected based on a comparison of the first resource with a rule defining destinations associated with encrypted communication traffic. The second device is selected based on hardware performance. The operations further include receiving, from a second device within the network, a second domain name service (DNS) request for an address of a third resource outside the network; sending, to the DNS, the second DNS request; receiving, from the DNS, a DNS response; returning, to the second device within the network in response the second DNS request, the second DNS request; and establishing a third encrypted connection between the second device and the third resource, to facilitate encrypted communication traffic between the second device and the third resource.

The systems and processes described here may be used to provide a number of potential advantages. A gateway can decouple domains from shared Internet Protocol (IP) addresses and selectively choose to intercept SSL, TLS, etc requests. If spoofed IP addresses are another server on the network, performance issues may be alleviated as only selective requests are sent to man in the middle (MitM) gateways fror decryption. Cryptographically protected traffic can be inspected at network egress and ingress, allowing a network administrator to enforce security policies consistently across both cryptographically protected traffic and plaintext traffic. By using standard communication protocols, browser devices (e.g. cell phones, tablets, laptops) can join the network with little or no special configuration.

DESCRIPTION OF DRAWINGS

FIG. 5 is a schematic diagram that shows an example of a computing device and a mobile computing device.

Like reference symbols in the various drawings indicate like elements

DETAILED DESCRIPTION

When data on a network is encrypted (e.g., by SSL or TSL) the data can pose challenges to network security appliances and routines in that it makes it difficult to inspect the data as it is transferred between the end users and servers on the Internet. This can lead to problems such as viruses being transferred over secure connections and entering the network instead of being blocked because the gateway security appliances could not inspect the data. In addition, organizational policies cannot be applied since the data within the encrypted traffic is protected causing security functions to fail as they cannot inspect the data.

Described in this document is a use of man in the middle decryption based on rules indicating which destinations should be decrypted and which should be passed directly to the Internet destination. A modified use of the Domain Name System (DNS) maps specific spoofed IP addresses to correlated domain in order to, among other uses, determine which encrypted connections should by bypassed and sent directly to the Internet destination and which connections should be decrypted using a man in the middle technique.

A computer network typically has one or more gateways that allow communication between devices on the network and devices on other networks (e.g. the Internet). One such gateway can be a network gateway that routes plaintext (i.e., non-encrypted) traffic among devices within the network and devices outside of the network. One common type of plaintext traffic that is routed through a network gateway is a DNS request, which is a request to the DNS to resolve a uniform resource locator (URL) or uniform resource indicated (URI) to an associated Internet Protocol (IP) address.

Instead of passing all DNS requests to the DNS, the network gateway can intercept some of the DNS requests if the network gateway determines that traffic between the network devices and the URLs or URIs will be encrypted. For these DNS requests, the network gateway can respond to the network device with the address or addresses of one or more man in the middle (MitM) gateways in the network. The MitM gateways may then act as man in the middle proxies for the resource at the URL or URI, allowing cryptographically secure communication that can be inspected when entering or exiting the network.

Figure 1:
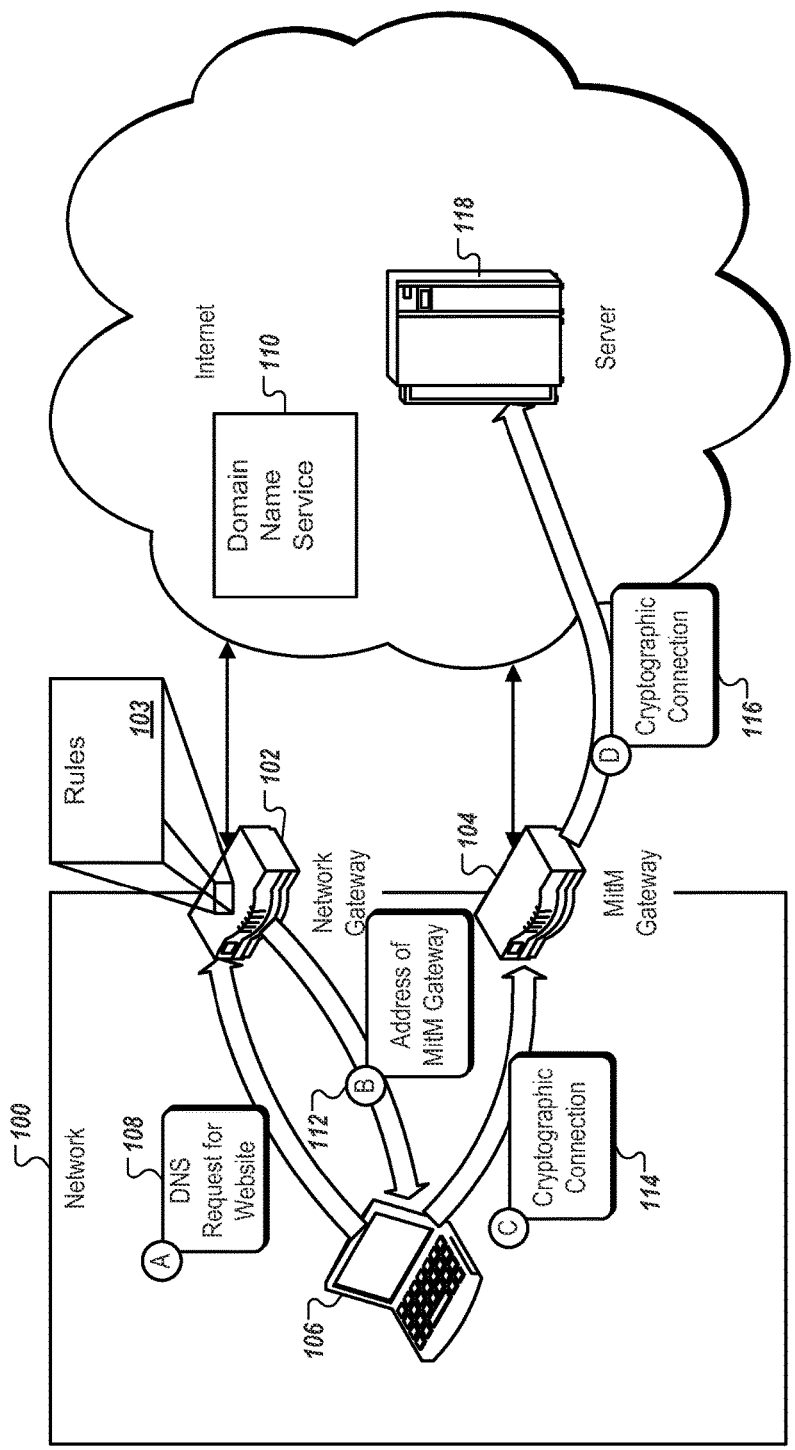
FIG. 1 is a block diagram of a network with a network gateway and a man in the middle gateway.

FIG. 1 is a block diagram of a network 100 with a network gateway 102 and a MitM gateway 104. Also shown in the network 100 is a browser device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106, network gateways 102, and/or MitM gateways 104.

The network 100 can be configured to route some or all of the plaintext messages addressed outside the network to the network gateway 102. The network gateway 102 can inspect the plaintext messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly. This process is sometimes referred to as spoofing.

For example, the network gateway may intercept and examine a DNS request 108 from the browser device 106 that is addressed to the DNS 110. Based on, for example, the URL or URI in the DNS request 108 and rules 103 indicating which destination should be decrypted and which should be passed directly to the Internet destination, the network gateway 102 may determine that, instead of passing the DNS request 108 to the DNS 110, the network gateway 102 should respond to the DNS request with a MitM gateway address 112. The network gateway 102 may be configured to make this determination so that encrypted communication from the browser device 106 first passes through the MitM gateway 104, thereby allowing the gateway 104 to decrypt the communication and perform man in the middle data inspection before allowing the communication to pass out of the network 100. The network gateway 102 may make the determining to pass encrypted communication through the MitM gateway 104 based on security policies or concerns as applied to the network 100. While passing communication through the MitM 104 may provide some other benefits (e.g., caching of frequently visited resources to reduce bandwidth usages), the rules 103 may be configured to primarily or exclusively account for the security considerations of passing communications through the network gateway 102 or the MitM gateway 104.

The browser device 106, upon receiving the MitM gateway address 112, can initialize a cryptographic connection 114 with the MitM gateway 104 at the MitM gateway address 112. The cryptographic connection 114 may be an SSL, TLS, or any other appropriate cryptographic session. The MitM gateway 104 may then initialize another cryptographic connection 116 with a server 118 that hosts the resource identified by the URL or URI of the DNS request 108.

Once the cryptographic connections 114 and 116 are established, the browser device 106 and the server 118 may communicate with each other. In this communication, the MitM gateway 104 may act as a proxy of the server 118 for the browser device 106 and as a proxy of the browser device 106 for the server 118. The MitM gateway 104 is thus able to receive an encrypted message from the browser device 106, decrypt the message, inspect the message, optionally alter or drop the message, encrypt the possibly altered message into a second encrypted form, and pass the message to the server 118. The MitM gateway 104 may perform the same type of reception, decryption, inspection, alteration or drop, encryption, and passage with messages from the server 118 to the browser device 106. The MitM gateway 104 may sometimes be referred to by other terms including, but not limited to, a reverse proxy, intercepting proxy, accelerator, accelerating proxy, and transparent proxy.

The inspection, alteration, and dropping can allow the MitM gateway 104 to ensure that encrypted communication into and out of the network conforms to any number of policies. For example, the network 100 may have a policy of inspecting incoming messages for computer viruses, malware, or other unwanted content. The network gateway 102, handling plaintext messages, can inspect the payloads of the messages and drop any messages that match viral signatures, malware black-lists, etc. The MitM gateway 104 may apply the same policy, inspecting incoming messages in their decrypted state and drop any messages that fail the same tests as applied by the network gateway 102.

Figure 2:
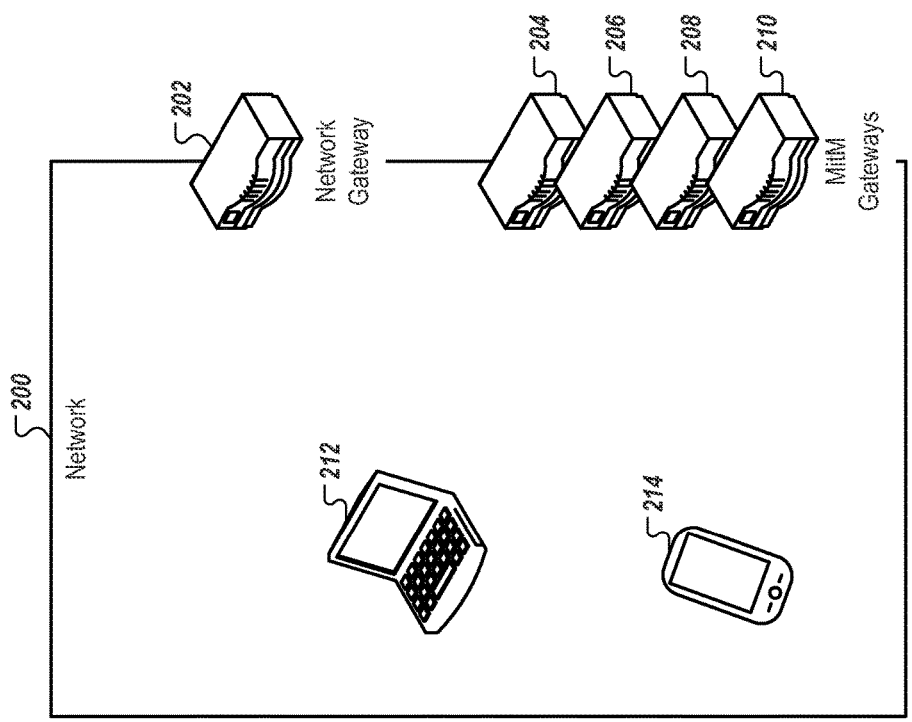
FIG. 2 is a block diagram of a network with a network gateway and a group of man in the middle gateways.

FIG. 2 is a block diagram of a network 200 with a network gateway 202 and a group of MitM gateways 204-210. The network 200 can be configured to route some or all of the plaintext messages addressed outside the network to the network gateway 202. The network gateway 202 can inspect the plaintext messages and, optionally, modify or drop a message. The network gateway 202 may also be configured to intercept and examine a DNS requests from browser devices 212 and 214 and respond directly with the address or addresses of one or more of the MitM gateways 204-210.

In general, decryption and encryption of network data may be a computationally intensive task for network appliances such as gateways. To alleviate performance issues, and for other reasons, the network gateway 202 and the group of MitM gateways 204-210 may be used to share or balance the load of the MitM gateways 204-210. The network gateway 202 may respond to a DNS request from a browser device 212 or 214 with address of all available MitM gateways 204-210 in the network 200. The browser devices 212 or 214 may then initiate a cryptographic connection with one the MitM gateway 204-210 in order to attempt to reach the resource specified in the DNS request.

The network gateway 202 may be configured to provide the addresses of the MitM gateways 204-210 in any appropriate scheme, for example, in any way that is permitted by the DNS standards. In one example, the network gateway 202 may always respond with the addresses in the same order. In another example, the network gateway 202 may rotate the order of addresses. The browser devices 212 and 214 may be configured to select one address from the group of returned addresses in any appropriate scheme, for example, in any way that is permitted by the DNS standard. In one example, the browser devices 212 and 214 may pseudorandomly select one of the addresses. In another example, the browser devices 212 and 214 cache a ping time every time an address is connected with, and the browser devices 212 and 214 may select the returned address associated with the lowest ping time.

In some cases, the network gateway 202 and the group of MitM gateways 204-210 may be used to route different classes of traffic to different MitM gateways 204-210. This may be desirable, for example, if policies of the network 200 specify that different policy tests should apply to different classes of encrypted traffic. Additionally, this may reduce the occurrence of prompts to a user that an encryption certificate is untrusted. The prompts may be acceptable, for example, if they only appear on less sensitive sites such as non-banking sites. Since only select sites may be subject to MitM inspection, the concerns for data loss may be greatly reduced.

In one example, the MitM gateway 204 may be configured to handle encrypted traffic that is generally unrestricted. That is, the encrypted traffic may not be inspected, modified, or dropped at all, or may be only minimally inspected (e.g., encrypted VPN (Virtual Private Network) traffic to and from a network at a branch office). For another class of traffic, the network administrator may wish to inspect only incoming traffic for virus, malware, or other malicious code (e.g., encrypted traffic to banking or financial institutions). For a third class of traffic, the network administrator may wish to inspect outgoing traffic to make sure secret or proprietary data is not being transmitted and inspect incoming traffic for malicious code (e.g., social networking and hosted storage sites). For a fourth class of data, a hosted application provider may share the same IPs for some services that should be permitted and for some services that should be blocked (e.g., an application provider hosts email and document sharing, which should be allowed, as well as media streaming, which should be blocked).

In this example, the MitM gateways 204-210 can be configured as follows:

| | |
|---|---|
| MitM gateway 204 | Perform no inspection of data. |
| MitM gateway 206 | Inspect and drop incoming data that contains malicious code. |
| MitM gateway 208 | Inspect and drop incoming data that contains malicious code. Inspect and drop outgoing data that contains secret or proprietary data. |
| MitM gateway 210 | Inspect and drop incoming data that contains malicious code. Determine which service the data is associated with, dropping any related to blocked services. |

To route traffic from the browser devices 212 and 214, the network gateway 202 may inspect received DNS requests and determine which of the MitM gateways 204-210 should handle the encrypted traffic. For example, the network gateway 202 may have a list that maps URLs and URIs to categories based on the type of content available at the URL or URI. When the network gateway 202 receives a DNS request, the network gateway 202 can compare the URL or URI of the DNS request to the list. If the request's URL or URI is not on the list, the network gateway 202 can pass the DNS request to the DNS for resolution. If the URL or URI is on the list, the network gateway 202 can respond to the requesting browser device 212 or 214 with the address of one of the MitM gateways 204-210 configured to handle traffic associated with the category that the URL or URI falls under.

Two browser devices 212 and 214 are shown in FIG. 2, however, these browser devices and other browser devices can enter and exit the network 200 over time. For example, a worker may bring one or more of her employer's or her own devices (e.g., laptop, phone, tablet) into the network 200 at the start of the day and remove the devices at the end when she goes home. Other than the configurations need to join the network (e.g. Wi-Fi passwords, plugging in Ethernet cords), the network 200 need not require any special configuration to ensure that encrypted traffic is routed through the correct MitM gateways 204-210 due to the fact that all messages to and from the browser devices conform to standards that are commonly supported on many common hardware, operating system, and browser systems.

Figure 3:
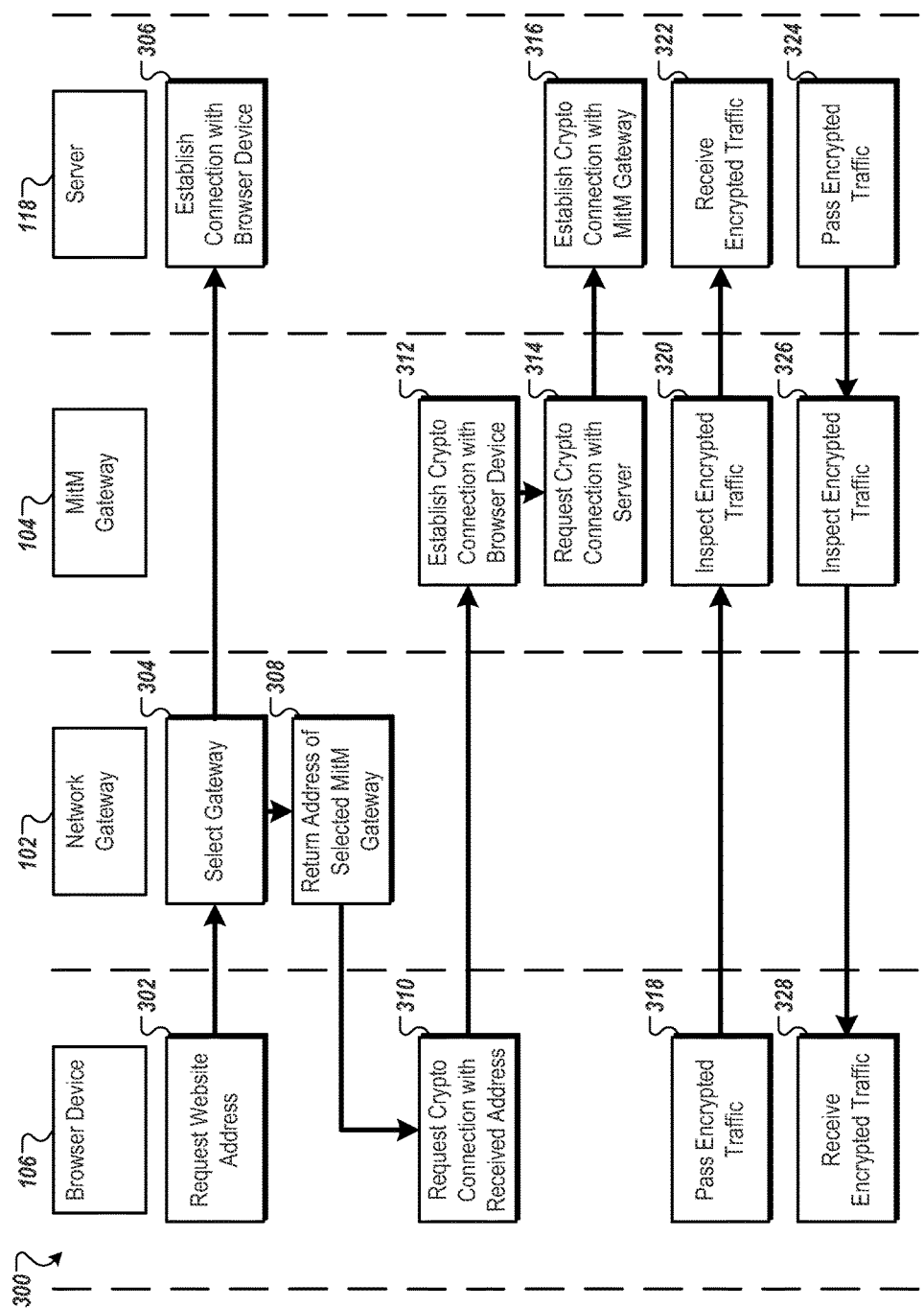
FIG. 3 is a swim-lane diagram of an example process for establishing a communication link through a man in the middle gateway.

FIG. 3 is a swim-lane diagram of an example process 300 for establishing a communication link through a MitM gateway. The process 300 is described with reference to the components shown in FIG. 1. However, other components, including and not limited to the components shown in FIG. 2, can be used to perform the process 300 or a similar process.

The browser device 106 creates a request for a website address (302). For example, a user may request to download, from a hosted storage system, a data object identified by a unique URI. The browser device can create a DNS request that includes the data object's URI and send the DNS request to the network gateway 102.

The network gateway 102 receives the request and selects a gateway to be used for traffic associated with the website address (304). For example, the network gateway 102 can process a set of rules 103 that indicate which destination should be decrypted and which should be passed directly to the Internet destination. These rules 103 may include, for example, a list of domain names and IP address mapped to security policies, content classifications, or directions for handling of network traffic (e.g., specifying that the traffic should be decrypted and inspected). By performing this determination on a DNS request for a resource, as opposed to for example an IP address for the resource, the network gateway 102 can handle all request to a resource in the same way, regardless of changes to the mapping between domain names and IP addresses. That is, the network gateway 102 does not need to keep a mapping of IP addresses to domain names, because the domain name or address for most resources is the permanent or canonical address of the resource.

If the network gateway 102 selects the network gateway 102 for the traffic to pass directly to the Internet destination, the browser device 106 and the server 118 establish a connection through the network gateway 102 (306). For example, if the network gateway 102 determines that the browser device 106 is likely to start an unencrypted communication session with the hosted storage system, the network gateway 102 can pass the DNS request to the DNS 110 (see FIG. 1) and permit the browser device 106 to create an unencrypted connection with the server 118.

If the network gateway 102 selects the MitM gateway 104, the network gateway 102 returns the address of the selected MitM gateway 104 (308). For example, the network gateway 102 may have a record of past connections with the hosted storage system and determine that the hosted storage system usually communicates through encrypted communication channels. In such a case, the network gateway 102 may select the MitM gateway 104 for the communication between the browser device 106 and the server 118 and thus may return the network address of the MitM gateway 104 to the browser device 106. The browser device 106 may have no indication that the address received is the address for the MitM gateway 104 and not for the server 118, as requested.

The browser device 106 requests an encrypted connection with the device at the received address, which is the MitM gateway 104 (310). For example, the browser device 106 may send to the MitM gateway 104 an SSL Hello or other encryption handshake message indicating the URL of the server 118 (or a resource of the server 118 such as the data object to be requested). In another example, the MitM gateway 104 may have multiple network addresses, each associated with known destination URLs. When a connection request is received at one of the multiple addresses, the MitM gateway 104 may look up the associated URL. The browser device 106 and the MitM gateway 104 establish a first encrypted connection (312). For example, the MitM gateway 104 may act as a proxy of the server 118, mimicking the interface of the server 118 in communications with the browser device 106.

The MitM gateway 104 requests an encrypted connection with the server 118 (314). For example, the MitM gateway 104 can use the URL of the encryption handshake from the browser device 106 to request an encrypted connection on behalf of the browser device 106. The MitM gateway 104 and the server 118 establish a second encrypted connection (316). For example, the MitM gateway 104 may act as a proxy of the browser device 106, mimicking the interface of the browser device 106 in communications with the server 118. The two encryption sessions may be of the same or different formats or types.

The browser device 106 generates traffic, encrypts the traffic into a first encrypted form, and passes the traffic to the MitM gateway 104 (318). For example, the browser device can create a HTTP Get request for the data object. The browser device can encrypt the HTTP Get request according to the requirements of the encrypted connection with the MitM gateway 104 and pass the encrypted HTTP Get request to the MitM gateway 104.

The MitM gateway 104 receives the traffic, decrypts the traffic, inspects the traffic, encrypts the traffic into a second encrypted form, and passes the traffic to the server 118 (320). For example, the MitM gateway 104 can decrypt the encrypted message into plaintext and determine that the message is an HTTP Get request. The MitM gateway 104 can compare the HTTP Get request with the rules of any policies that apply to traffic out of the network 100. If the HTTP Get request does not violate any policy, the MitM gateway 104 can encrypt the HTTP Get request according to the requirements of the encrypted connection with the server 118 and pass the encrypted HTTP Get request to the server 118. If the HTTP Get request does violate a policy, the MitM gateway 104 can modify or drop the request, as specified by the policy.

The server 118 receives the traffic in the second encrypted form (322). For example, the server 118 may receive the encrypted HTTP Get request, decrypt the HTTP Get request, and determine that the user of the browser device 106 has authorization to access the requested data object.

The server 118 generates traffic, encrypts the traffic into a third encrypted form, and passes the traffic to the MitM gateway 104 (324). For example, the server 118 can access the requested data object, format the data object into XML or other appropriate format, and add the XML object to an HTTP reply. The server 118 can encrypt the HTTP reply according to the requirements of the encrypted connection with the MitM gateway 104 and pass the encrypted HTTP reply to the MitM gateway 104

The MitM gateway 104 receives the traffic, decrypts the traffic, inspects the traffic, encrypts the traffic into a fourth form, and passes the traffic to the browser device 106 (326). For example, the MitM gateway 104 can decrypt the encrypted message into plaintext and determine that the message is an HTTP reply. The MitM gateway 104 can compare the HTTP reply with the rules of any policies that apply to traffic into the network 100. If the HTTP reply does not violate any policy, the MitM gateway 104 can encrypt the HTTP reply according to the requirements of the encrypted connection with the browser device 106 and pass the encrypted HTTP reply to the browser device 106. If the HTTP reply does violate a policy (e.g., contains malicious code, too large), the MitM gateway 104 can modify or drop the reply, as specified by the policy.

The browser device 106 receives the encrypted traffic (328). For example the browser device can decrypt the HTTP reply, extract the XML object, and store the XML object to disk.

Although a particular number, type, and order of operations are shown here, other numbers, types, and orders of operations are possible. For example, if there are multiple MitM gateways available, the network gateway 102 may select one or more and return the addresses of selected MitM gateways. In another example, the browser device 106 and the server 118 may create and pass encrypted traffic in the opposite order shown here or substantially at the same time.

Figure 4:
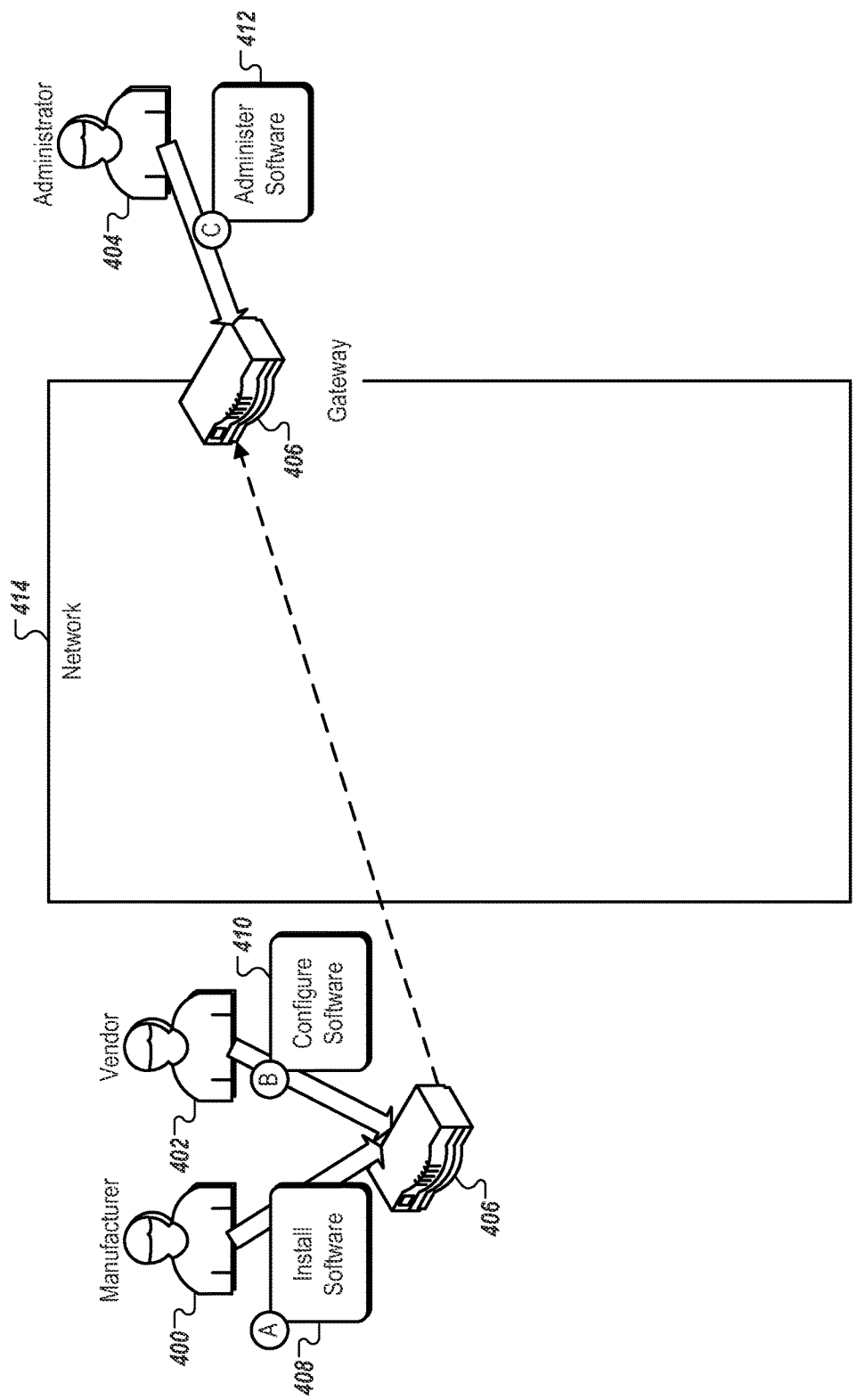
FIG. 4 is a block diagram showing example users responsible for a gateway.

FIG. 4 is a block diagram showing example users responsible for a gateway. The users will be described according to their responsibilities for manufacturing, selling, and administering a gateway. In some cases, each of the users shown corresponds to many users, and/or some users may be responsible for more than on task described.

A manufacturer 400 is responsible for designing, assembling, and installing software 408 on a gateway 406. The installed software may have many configurable options, including options to configure the gateway 406 to behave as a network gateway 102 or 202 and/or as a MitM gateway 104 or 204-210.

A vendor 402 is responsible for selling the gateway 406 to a customer. The vendor 402 may be able to configure the software 410 of the gateway 406 to behave as a network gateway 102 or 202 and/or as a MitM gateway 104 or 204-210. In some cases, the vendor 402 may replace the software that the manufacturer 400 installed on the gateway 406 as part of configuring the gateway 406.

An administrator 404 is responsible for administering the network 414, which may include the gateway 406. In some cases, the administrator 404 is able to configure the software 410 of the gateway 406 to behave as a network gateway 102 or 202 and/or as a MitM gateway 104 or 204-210. In some cases, the administrator 404 may replace the software that the manufacturer 400 or vendor 402 installed on the gateway 406 as part of configuring the gateway 406.

FIG. 5 shows an example of a computing device 500 and an example of a mobile computing device that can be used to implement the techniques described here. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method performed by data processing apparatus, the method comprising:
   receiving, from a device within a network, a domain name service (DNS) request for an address of a first resource outside the network;
   determining that the first resource is associated with a security policy of the network that specifies decrypting encrypted traffic between the device within the network and the first resource;
   responsive to the determination that the first resource is associated with a security policy of the network that specifies decrypting encrypted traffic between the device within the network and the first resource, returning, to the device within the network in response the DNS request, a DNS response comprising an address of a gateway within the network, the gateway address having previously been associated with the first resource address;
   establishing a first encrypted connection between the device and the gateway, and a second encrypted connection between the gateway and the first resource, to facilitate encrypted communication traffic between the device and the first resource;
   decrypting, by the gateway, all of the encrypted communication traffic passing between the device and the first resource such that all of the encrypted communication traffic passing between the device and the first resource is available to the gateway for inspection; and
   inspecting at least some of the encrypted communication traffic passing between the device and the first resource;
   receiving, from a second device within the network, a second domain name service (DNS) request for an address of a second resource outside the network;
   determining that the second resource is not associated with a security policy of the network that specifies decrypting encrypted traffic between the second device with the network and the second resource;
   responsive to the determination that the second resource is not associated with a security policy of the network that specifies decrypting encrypted traffic between the second device and the second resource, sending, to the DNS, the second DNS request;
   receiving, from the DNS, a DNS response;
   returning, to the second device within the network and in response to receiving the second DNS request, the second DNS request; and
   establishing a third encrypted connection between the second device and the second resource, to facilitate encrypted communication traffic between the second device and the second resource.

2. The method of claim 1, wherein the address of the first resource is determined by the gateway based on the address returned in the DNS response.

3. The method of claim 1, wherein decrypting and inspecting the encrypted communication traffic includes blocking the encrypted communication traffic.

4. The method of claim 1, the method further comprising selecting the gateway from a plurality of available devices within the network.

5. The method of claim 4, wherein the gateway is selected based on a comparison of the first resource with a rule defining destinations associated with encrypted communication traffic.

6. The method of claim 4, wherein the gateway is selected based on hardware performance.

7. A non-transitory computer storage media encoded with computer program instructions that, when executed by one or more processors, cause a computer device to perform operations comprising:

receiving, from a device within a network, a domain name service (DNS) request for an address of a first resource outside the network;

determining that the first resource is associated with a security policy of the network that specifies decrypting encrypted traffic between the device within the network and the first resource;

responsive to the determination that the first resource is associated with a security policy of the network that specifies decrypting encrypted traffic between the device within the network and the first resource, returning, to the device within the network in response the DNS request, a DNS response comprising an address of a gateway within the network, the gateway address having previously been associated with the first resource address;

establishing a first encrypted connection between the device and the gateway, and a second encrypted connection between the gateway and the first resource, to facilitate encrypted communication traffic between the device and the first resource;

decrypting, by the gateway, all of the encrypted communication traffic passing between the device and the first resource such that all of the encrypted communication traffic passing between the device and the first resource is available to the gateway for inspection; and inspecting at least some of the encrypted communication traffic passing between the device and the first resource;

receiving, from a second device within the network, a second domain name service (DNS) request for an address of a second resource outside the network;

determining that the second resource is not associated with a security policy of the network that specifies decrypting encrypted traffic between the second device with the network and the second resource;

responsive to the determination that the second resource is not associated with a security policy of the network that specifies decrypting encrypted traffic between the second device and the second resource, sending, to the DNS, the second DNS request;

receiving, from the DNS, a DNS response;

returning, to the second device within the network and in response to receiving the second DNS request, the second DNS request; and establishing a third encrypted connection between the second device and the second resource, to facilitate encrypted communication traffic between the second device and the second resource.

8. The computer storage media of claim 7, wherein the address of the first resource is determined by the gateway based on the address returned in the DNS response.

9. The computer storage media of claim 7, wherein decrypting and inspecting the encrypted communication traffic includes blocking the encrypted communication traffic.

10. The computer storage media of claim 7, wherein the operations further comprise selecting the gateway from a plurality of available devices within the network.

11. The computer storage media of claim 10, wherein the gateway is selected based on a comparison of the first resource with a rule defining destinations associated with encrypted communication traffic.

12. The computer storage media of claim 10, wherein the gateway is selected based on hardware performance.

13. A system comprising:

one or more processors configured to execute computer program instructions; and non-transitory computer storage media encoded with computer program instructions that, when executed by one or more processors, cause a computer device to perform operations comprising:

receiving, from a device within a network, a domain name service (DNS) request for an address of a first resource outside the network;

determining that the first resource is associated with a security policy of the network that specifies decrypting encrypted traffic between the device within the network and the first resource;

responsive to the determination that the first resource is associated with a security policy of the network that specifies decrypting encrypted traffic between the device within the network and the first resource, returning, to the device within the network in response the DNS request, a DNS response comprising an address of a gateway within the network, the gateway address having previously been associated with the first resource address;

establishing a first encrypted connection between the device and the gateway, and a second encrypted connection between the gateway and the first resource, to facilitate encrypted communication traffic between the device and the first resource;

decrypting, by the gateway, all of the encrypted communication traffic passing between the device and the first resource such that all of the encrypted communication traffic passing between the device and the first resource is available to the gateway for inspection; and inspecting at least some of the encrypted communication traffic passing between the device and the first resource;

receiving, from a second device within the network, a second domain name service (DNS) request for an address of a second resource outside the network;

determining that the second resource is not associated with a security policy of the network that specifies decrypting encrypted traffic between the second device with the network and the second resource;

responsive to the determination that the second resource is not associated with a security policy of the network that specifies decrypting encrypted traffic between the second device and the second resource, sending, to the DNS, the second DNS request;

receiving, from the DNS, a DNS response;

returning, to the second device within the network and in response to receiving the second DNS request, the second DNS request; and establishing a third encrypted connection between the second device and the second resource, to facilitate encrypted communication traffic between the second device and the second resource.

14. The system of claim 13, wherein the address of the first resource is determined by the gateway based on the address returned in the DNS response.

15. The system of claim 13, wherein decrypting and inspecting the encrypted communication traffic includes blocking the encrypted communication traffic.

16. The system of claim 13, wherein the operations further comprise selecting the gateway from a plurality of available devices within the network.

17. The system of claim 16, wherein the gateway is selected based on a comparison of the first resource with a rule defining destinations associated with encrypted communication traffic.

18. The system of claim 16, wherein the gateway is selected based on hardware performance.

* * * * *